No. 814,753. PATENTED MAR. 13, 1906.
J. W. WALLACE.
TANK.
APPLICATION FILED OCT. 18, 1904.

Witnesses
Edgeworth Greene
Edwin Vandewater

John W. Wallace Inventor
By his Attorney H. A. West

UNITED STATES PATENT OFFICE.

JOHN W. WALLACE, OF BROOKLYN, NEW YORK.

TANK.

No. 814,753.  Specification of Letters Patent.  Patented March 13, 1906.

Application filed October 18, 1904. Serial No. 228,932.

*To all whom it may concern:*

Be it known that I, JOHN W. WALLACE, a citizen of the United States, and a resident of Brooklyn, in the county of Kings and State of New York, have invented certain new and useful Improvements in Tanks, of which the following is a specification.

My invention relates to the construction of the heads or bottoms of tanks, vessels, or barrels made of metal, usually of steel, and designed for holding and transporting aerated liquids, oils, chemicals, lacquers, varnishes, and the like. Such vessels, especially when filled, are subjected to great stress of interior pressure and to excessive jamming and wear, particularly at the chime, which is likely to break the seam and cause leakage. They are expensive to manufacture, and in case of any defect in the attachment of the head or bottom to the body of the vessel the whole becomes practically useless and in case of high interior gaseous pressure dangerous.

By my invention I am enabled to manufacture metal tanks, casks, or vessels, usually termed "steel" tanks, which possess great strength and durability and which will stand rough usage and in which the work of soldering or brazing the head or bottom on the body can be cheaply, perfectly, and reliably done.

Figure 1:
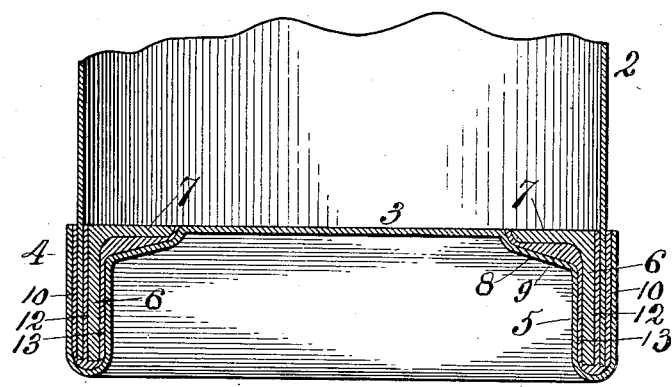
Figure 2:
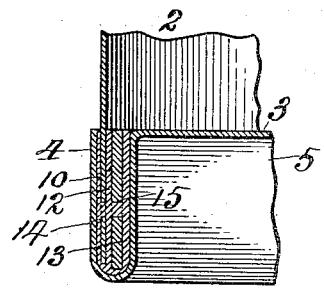

In the accompanying drawings, to which reference is made and which form part of this specification, Figure 1 is a sectional elevation of a portion of a body of a vessel, tank, or barrel, showing a head or bottom applied thereto in accordance with my invention. Fig. 2 is a like view showing a modification.

In the drawings, 2 designates the body of the vessel or tank, and 3 the head or bottom thereof, it being understood that the opposite end of the body may be finished in duplicate or in any other desired manner. The body is of metal, preferably of cold-rolled steel, and the head or bottom is by preference of like material, preferably stamped up in a die or otherwise formed, with an outer flange 4 and an inner flange 5, both formed as a part of the head or bottom proper, which is elevated in the body of the tank. The body 2 and a reinforcing piece or member 6 are soldered or brazed in the space between the said inner and outer flanges 4 5. The reinforcement 6 is by preference in the form of a circular angle-iron having the said member 6 and a horizontal member 7, and by preference the bottom 3 is depressed, as shown at 8, to receive the said horizontal member, so that the upper surface of the angle-piece will be flush or substantially flush with the inner surface of the bottom 3, and said depression 8 is by preference made on a greater angle than that of the angle-piece, so as to form a space to receive a body of brazing metal or solder 9, as shown. In Fig. 2 the reinforcement is shown as being formed of a metal ring; but I prefer the angle form shown in Fig. 1, since the horizontal portion thereof resists internal pressure and greatly strengthens the bottom and body of the structure.

The parts being completed to fit one another, they are put together and the whole placed upon a level support or table, and they are soldered or brazed together by heating and flowing the metal in at the upper edge of the outer flange 4, and for this purpose the upper edge or the lowest part of the upper edge of the outer flange 4 is made on a level to which it is desired to have the solder or brazing metal flow in the spaces between the body, the reinforcement, and the flanges 4 and 5—that is to say, as here shown, the upper edge of the outer flange 4 is on a level with the elevated bottom 3. The soldering or brazing metal forms three layers 10 12 13 and unites the six surfaces of metal, and when the spaces are filled the solder or brazing metal will overflow at the top of the flange 4, and thus indicate that the soldering or brazing is perfectly done throughout. In this way not only is the tank bottom or head perfectly soldered or brazed to the body, but the chime is of great strength and durability and no jamming or pressure can part the seams.

In order to facilitate the flow of solder or brazing metal, I form openings 14 15 through the body 2 and through the reinforcement 6, as shown in dotted lines in Fig. 2.

Having thus described my invention, what I claim as new, and desire to secure by Letters Patent, is—

1. A metal vessel comprising a main body, a bottom elevated in the body and formed with integral inner and outer flanges, the upper edge of the outer flange being on a level with the bottom and spaced from the inner flange, and a metal ring, the lower edge of the main body and the said ring being inserted in the space between the said flanges and soldered or brazed therein, substantially as described.

2. A metal vessel comprising a main body, a bottom elevated in the body and formed with inner and outer flanges and an angle-piece, the body and one member of the angle-piece being soldered or brazed together between the said flanges, substantially as shown and described.

3. A metal vessel comprising a main body, a bottom elevated in the body and formed with an inner and outer flange and depressed adjacent to the inner flange, and an angle-piece the vertical member of which is brazed or soldered together with the main body in the space between the said flanges the horizontal member of which overlies the said depression in the bottom and brazed or soldered thereto, substantially as described.

JOHN W. WALLACE.

Witnesses:
H. A. WEST,
EDWIN VANDEWATER